United States Patent [19]

Lawson et al.

[11] 4,005,248
[45] Jan. 25, 1977

[54] SMOKE-INHIBITED POLYMER COMPOSITIONS

[75] Inventors: David Francis Lawson, Akron; Jung Wong Kang, Clinton, both of Ohio

[73] Assignee: The Firestone Tire & Rubber Company, Akron, Ohio

[22] Filed: June 10, 1975

[21] Appl. No.: 585,553

[52] U.S. Cl. .............................. 526/20; 260/2 M; 260/45.75 G; 526/21; 526/48
[51] Int. Cl.² .................... C08F 8/42; C08F 8/44; C08F 12/08; C08F 212/08
[58] Field of Search ............... 260/45.75 G, 94.7 R, 260/2 M; 450/610.5; 526/20, 48

[56] References Cited

UNITED STATES PATENTS

| | | | |
|---|---|---|---|
| 3,278,441 | 10/1966 | Manuel et al. | 260/94.7 R X |
| 3,637,543 | 1/1972 | Kris et al. | 260/2.5 AM X |
| 3,725,319 | 3/1973 | Frisch | 260/77.5 NC X |
| 3,729,436 | 4/1973 | Phillips | 260/891 X |
| 3,746,664 | 7/1973 | Doenge | 260/2.5 AM |
| 3,766,157 | 10/1973 | Pants et al. | 260/880 R |
| 3,903,028 | 9/1975 | Mitches | 260/45.75 G X |

OTHER PUBLICATIONS

Reactions of Polystyrene with Chromium Hexacarbonyl, by Pittman et al., Journal Pol. Science, Part A-1, vol. 10, pp. 379–386 (1972).

*Primary Examiner*—William F. Hamrock

[57] ABSTRACT

The evolution of smoke from the combustion of organic polymers which contain aromatic moieties, especially polymers of styrene, with and without other monomers, is reduced materially by forming a complex of the polymer and chromium carbonyl.

9 Claims, No Drawings

SMOKE-INHIBITED POLYMER COMPOSITIONS

PRIOR ART

Recently a number of patents have issued on reducing the smoke generated on the combustion of polymers. See for example,

| | |
|---|---|
| Kus et al. | 3,637,543 |
| Frisch | 3,725,319 |
| Doerge et al. | 3,746,664 |
| Doerge et al. | 3,758,638 |

Phillips 3,729,436 describes chromium carboxylates as flame retardants.

Parts et al. U.S. Pat. No. 3,766,157 describes the reduction of smoke from several styrene polymers and copolymers by use of the 8-hydroxyquinoline salts of iron, manganese or chromium. These additives are not capable of bonding to the polymer structure. The patent does not describe or suggest $\pi$-aryl chromium tricarbonyl complexes as a means to smoke inhibition of aromatic polymers.

Organometallic Polymers XVI, Copolymerization of Styrenetricarbonylchromium and the Reaction of Polystyrene with Chromium Hexacarbonyl by Pittman et al. in Journal of Polymer Science, Part A-1, Vol. 10, pages 379–386 (1972) describes the reaction of chromium hexacarbonyl with polystyrene and the production of a reaction product in which 32.2 percent of the phenyl rings are complexed with —Cr(CO)$_3$ units and containing 11.33 percent of chromium. The article does not refer to burning the polymer or suggest that a small percentage of the chromium tricarbonyl complexed with a polymer acts as a smoke depressant. The article does not refer to a copolymer which contains 0.4 to 10 weight percent of chromium and preferably at least 3 percent, which is sufficient to inhibit the formation of smoke when the article is burned.

SUMMARY OF THE INVENTION

Compositions of combustible polymers containing repeating aromatic units and particularly those compositions which have a smoke density, $D_{mc}$, of at least 75 (using NBS chamber), and rendered smoke-inhibited if the aromatic units of the composite are complexed with sufficient chromium tricarbonyl to produce a chromium content of at least 0.4 percent, based on the weight of the aromatic units, and in no case more than 10 percent based on the weight of the polymer. Such polymers include styrene homopolymers and copolymers, unsaturated polyesters (including thermoset resins), epoxy resins, etc. The illustrative material herein refers to a thermoset polymer of butadiene and styrene which contains $\pi$-phenyl chromium tricarbonyl groups incorporated through direct reaction of the polymer. However, it is readily obvious that chromium tricarbonyl groups may be incorporated by other methods, such as copolymerization, or the inclusion of co-reactive additives which contain aromatic chromium tricarbonyl groups. An example of the latter method might be unsaturated thermoset resins (e.g. the uncomplexed styrene-butadiene polymers used in the illustrative example) to which is added, e.g. $\pi$-divinyl benzene chromium tricarbonyl before the composition is cured. When formulated with varying amounts of other compounding ingredients, including plasticizers, fillers, stabilizers or curing agents, etc. the compositions resulting therefrom may have chromium contents ranging from as little as 0.05 percent to as much as 10 percent, or perhaps more, based on the weight of the entire composite. Properties required in a given application will dictate the level of other compounding ingredients necessary in any particular composition.

Alumina trihydrate in the range of 40 to 200 parts per 100 parts of the polymeric material may be used to reduce both the rate and the maximum level of smoke evolved.

By "smoke" herein we refer to the visible, air-borne suspension of fine solid or liquid particles. By "smoke-inhibited" herein we mean having the amount of this air-borne suspension reduced, as indicated in a suitable test measuring visible smoke density (described below).

By "complex", we mean the chemical attachment of the chromium tricarbonyl grouping to an aromatic liquid which liquid may be the polymer which is rendered smoke inhibited or it may be an additive in the polymer composite.

The combustible polymeric material may be rendered smoke inhibited by (1) combining therewith only sufficient chromium complex to produce a smoke-inhibited composite or by (2) mixing complexed polymer with uncomplexed polymer in such an amount as to produce a smoke-inhibited mixture, or by (3) mixing a reactive additive containing the chromium tricarbonyl complex with an uncomplexed polymer so as to produce a smoke-inhibited composite within which the organic chromium complex is bound. In the instant examples it was found most convenient to prepare the complexed polymers by chemically reacting the polymeric materials in solution. The resins employed were of low molecular weight, easily soluble and readily handled in this manner. In other cases it may be desirable to obtain the complexed polymers by polymerization or copolymerization of a corresponding complexed monomer. In still other cases it may be most practical to incorporate the complex as a reactive additive in a composition which is subsequently cured by a procedure by which the complex is chemically bound to the composite network.

The polymers may be complexed by following the general procedure of Pittman et al.

The polymers which can be complexed include the polystyrenes, copolymers of styrene with butadiene, isoprene, acrylonitrile, etc., copolymers such as ABS, SBS, BSBS, etc., polymers which comprise repeating aliphatic and/or aromatic units joined by aromatic units such as biphenyl, dihydroxyphenyl, diphenyl sulfide, diphenyl ether, etc. In other words, generally polymers or cured polymer composites, which include aromatic units and are capable of being complexed with chromium tricarbonyl groups, and particularly rubbery and plastic polymers, cured and uncured.

The polymers may contain only sufficient of the chromium complexing unit to render them smoke inhibited, or they may be mixed with non-complexing combustible polymeric material such as plasticizers and other modifiers, and complexed with sufficient of the chromium tricarbonyl units to render the composition smoke-inhibited. Or polymers which comprise more of the chromium complexing unit than is necessary to render them smoke-inhibited, may be mixed with other combustible polymeric material to form a combustible polymeric composition which is smoke-inhibited.

Fillers of various types may be used. For instance, silica, glass fibers, glass fabric, asbestos, etc. may be added in an amount from 150 to 500 parts by weight per 100 parts of the polymeric material. In such cases, it is desirable to include for each 100 parts of silica, glass fibers or glass fabric, 0.5 to 2.0 parts of an agent for bonding the filler to the polymeric material, such as unsaturated-group-containing silane on the order of vinyl triacetoxysilane, vinyl tributoxy silane, vinyl trimethoxy silane or vinyl triethoxy silane.

Lubricant, such as 0.5 to 5 parts of calcium stearate or other metal salt of a fatty acid containing from 8 to 26 carbon atoms may be used including, for instance, calcium 2-ethylhexanoate, calcium octoate, calcium laurate, calcium myristate, calcium palmitate, calcium oleate, calcium arachidate, magnesium stearate, magnesium octoate, magnesium oleate, zinc stearate, zinc oleate, zinc laurate, cadmium stearate and the like.

The following procedure is representative of the procedure for incorporating $Cr(CO)_3$ units into the subject polymer. A table is given which summarizes the results obtained under different conditions.

EXAMPLE 1

A thoroughly cleaned and dried Strohmeier reactor, fitted with a cold-water condenser and a 65° C. condenser and 82° C. heater, and a heating mantle, was fitted with a one liter round-bottom flask which contained the following:

| | |
|---|---|
| 50 g. | purified high vinyl copolymer of butadiene and styrene, containing ca. 40 per cent by weight styrene, with ca. 90 per cent of the butadiene units in 1,2-configuration |
| 7 g. | chromium hexacarbonyl |
| 80 ml. | 1,2-dimethoxyethane, distilled from $CaH_2$ |
| 200 ml. | 2,2'-bis(methoxyethyl)ether, distilled under vacuum from $CaH_2$ |

The reactor was flushed with nitrogen and heated to vigorous reflux under nitrogen for three days. It was then allowed to cool, and the reactants were concentrated in vacuo (traces of unreacted $Cr(CO)_6$ were recovered) then poured slowly into methanol to precipitate a green elastomer with a high degree of cold-flow behavior. The polymer solution was filtered, then dissolved and reprecipitated twice from hexane-methanol. It was finally filtered, dried for 24 hours in a vacuum oven at 50° C., then broken up and processed.

The polymer-chromium carbonyl adduct prepared by this procedure had a dilute solution viscosity similar to the untreated polymer, indicating little alteration of polymer molecular weight, e.g., through degradation or crosslinking. The infra-red spectrum of a $CS_2$ solution of this product shows a pronounced absorption at 5.26 $\mu$, due to C = O in an $Ar-Cr(CO)_3$ complex, slightly greater in intensity than that for C-H stretch. Analysis by atomic absorption after ashing found 3.06 weight percent chromium. Infra-red analysis of the polymer microstructure showed a reduction in the styrene content similar to the amount of chromium incorporation (styrene down 3-4 percent), with the polybutadiene portion distributed as 87.5 percent by weight 1,2-addition, 5.8 percent trans-1,4 and 6.6 percent cis-1,4 addition. The polymer was dissolved in a small amount of hexane for subsequent solution compounding and evaluations.

EXAMPLE 2

Using the same copolymer described in Example 1 and procedures similar to that outlined in Example 1, other polymer metallations were carried out. These are summarized in Table I (Example 1 is Run A).

TABLE I

| RUN | WT. POLYMER CHARGED (g) | WT. $Cr(CO)_6$ CHARGED (g) | VOLUME RATIO OF SOLVENTS* | REACTION TIME (DAYS) | RECOVERED POLYMER WT. (g) | IR, 5.26 cm | % Cr IN POLYMER |
|---|---|---|---|---|---|---|---|
| A | 50 | 7 | 80/200 | 3 | 48 | Med. | 3.06 |
| B | 10 | 7 | 200/100 | 2 | 10.1 | Weak | 0.98 |
| C | 100 | 3 | 200/100 | 2 | 98 | V. Weak | 0.37 |
| D | 90 | 5 | 200/200 | 3 | 90 | V. Weak | 0.33 |
| E | 100 | 10 | 200/300 | 3.5 | 104.3 | Med. | **est'd. 2–3 on basis of IR |

*Volume ratio of (1,2-dimethoxyethane)/(2,2'-bis(methoxyethyl)ether).
**Estimated on basis of IR. A. A. analysis indicated 0.35 – 0.36 per cent which is believed to be low because not supported by IR or smoke results.

The products of these reactions were dissolved in hexane and mixed in accordance with the following recipes, using a Kitchen-Aid mixer;

TABLE II

| | PARTS BY WEIGHT | | | | |
|---|---|---|---|---|---|
| | F | G | H | I | J |
| High vinyl poly(butadiene-co-styrene) | 100 | — | — | — | — |
| Product A | — | 100 | — | — | — |
| Product C | — | — | 100 | — | — |
| Product D | — | — | — | 100 | — |
| Product E | — | — | — | — | 100 |
| Silica | 280 | 280 | 280 | 280 | 280 |
| Alumina trihydrate | 100 | 100 | 100 | 100 | 100 |
| Vinyl triacetoxysilane | 3 | 3 | 3 | 3 | 3 |
| Calcium stearate | 3 | 3 | 3 | 3 | 3 |
| Dicumyl peroxide, 40% | 10 | 10 | 10 | 10 | 10 |

After mixing, the compounds were dried in vacuo at 50°–60° C. overnight, then pressed into 6 × 6 × 0.066 inch plaques and cured for 6 minutes at 350° F. under pressure. These plaques were then cut into 3 × 3 inch squares which were dried in a vacuum oven. These plaques were then preconditioned at 50 percent relative humidity for 1 day before evaluating for smoke generation. The tests were conducted in an NBS chamber of the type here described:

NATIONAL BUREAU OF STANDARDS SMOKE DENSITY CHAMBER

Evaluations for the density of visible smoke were made using a commercial smoke density chamber modeled after one developed at the National Bureau of Standards by the Tire Research Group (see D. Gross, J. J. Loftus and A. F. Robertson, ASTM SPECIAL TECHNICAL PUBLICATION 422, pages 166–204 (1969).) This chamber contains a radiant heater producing 2.5 W/cm² of heat at the surface of a 3 × 3 inch sample, a propane-air pilot burner and a vertical beam of light with a photomultiplier tube detector and microphotometer to record the attenuation of light by smoke developing in the chamber. During smoke testing, the chamber is sealed to enclose the combustion products and smoke. The smoke developed is measured as Specific Optical Density, $D_S$, where $$D_S = \frac{V}{AL} \log_{10} \frac{T_o}{T} = 132 \log_{10} \frac{T_o}{T}$$

$V$ = volume of chamber
$A$ = area of test specimen
$L$ = length of light path
$T_o$ = initial light transmittance through the chamber
$T$ = transmittance of light during test.

At the peak of smoke build-up $D_S = D_m$, and for purposes of the report, corrected maximum smoke is recorded as $D_{mc} = D_m - D_c$ where $D_c$ is the clear beam specific optical density occurring after the smoke test, when the chamber has been exhausted of smoke. Lower values of $D_{mc}$ indicate less obscuration of light due to smoke.

Several other quantities measured include the time in minutes to 90 percent of $D_m$ ($t.9D_m$) and the time (in minutes) to $D_S = 16$ ($tD_{16}$), which are indicative of the rates of smoke development (higher numbers signify slower rates), as well as the smoke obscuration number for the first 4 minutes of test, $SON_4$, where $$SON_4 = \frac{D_S (1 \text{ min.}) + D_S (2 \text{ min.}) + D_S (3 \text{ min.}) + D_S (4 \text{ min.})}{4}$$

which also represents the early rate of smoke development (lower numbers mean less smoke).

EXAMPLE 3

The smoke density chamber results for flaming exposure, for the butadiene-styrene specimens prepared as described in Table II are listed in Table III. The numbers shown are the averaged results of at least two determinations. The lower the $D_{mc}$ the better the result.

TABLE III

| SAMPLE NO. | APPROX.% Cr. IN POLYMER | $D_{mc}$ | $t.9D_m$ | $t.D_{16}$ | $SON_4$ |
|---|---|---|---|---|---|
| F | 0 (control) | 189 | 3.6 | 1.54 | 112 |
| G | .3 | 139 | 4.9 | 2.12 | 54 |
| H | <0.4 | 169 | 2.9 | 1.6 | 101 |
| I | <0.4 | 163 | 4.3 | 2.2 | 68 |
| J | 2–3 | 114 | 5.4 | 1.72 | 55 |

These figures show that maximum smoke reduction is obtained when the amount of chromium present as the complex in the treated polymer resin is greater than 0.4 percent Cr. Both the rate and maximum level of smoke were reduced in these specimens, which also contained alumina trihydrate.

EXAMPLE 4

The effect of styrene-bound metal complex on smoke generation of filled poly(butadiene-co-styrene) compounds without alumina trihydrate was tested by preparing and evaluating the specimens shown in Table IV.

TABLE IV

| | PARTS BY WEIGHT | | |
|---|---|---|---|
| | K | L | M |
| High vinyl poly (butadiene-co-styrene) | 100 | — | — |
| Product C | — | 100 | — |
| Product E | — | — | 100 |
| Silica | 380 | 380 | 380 |
| Vinyl triacetoxysilane | 3 | 3 | 3 |
| Calcium stearate | 3 | 3 | 3 |
| Dicumyl peroxide, 40% | 10 | 10 | 10 |

The compounds were mixed, cured and prepared for evaluation in the NBS chamber as specified above. The results of these smoke density evaluations are given in the following Table V.

TABLE V

| SAMPLE NO. | APPROX.% Cr. IN POLYMER | $D_{mc}$ | $tD_{16}$ | $t.9D_m$ | $SON_4$ |
|---|---|---|---|---|---|
| K (Control) | 0 | 266 | 1.05 | 1.8 | 215 |
| L | <0.4 | 268 | 0.95 | 1.7 | 217 |
| M | 2–3 | 192 | 0.9 | 1.64 | 164 |

This table shows that maximum visible smoke is reduced in the presence of sufficient Cr complex, but little change in rate of smoke development accompanies this improvement in the absence of hydrated alumina filler.

We claim:
1. Smoke-inhibited combustible composition containing polymeric materials having a backbone or network containing repeating aromatic units, either incorporated in the backbone or network or pendant to the backbone or network, at least a portion of said aromatic units being complexed with chromium tricarbonyl so as to form π-phenyl chromium tricarbonyl units, in which composition the chromium content is chemically bonded to said aromatic units, and is 0.4 to 10 percent of the weight of the polymeric material, as determined by IR analysis.

2. The composition of claim 1 in which the complexed repeating units are styrene units.

3. The composition of claim 1 which includes 40 to 100 parts of alumina trihydrate per 100 parts of the polymeric material.

4. The composition of claim 1 in which the polymeric material is butadiene-styrene copolymer.

5. The composition of claim 4 in which the copolymer contains about 40 percent of styrene and about 90 percent of the butadiene units are in the 1,2-configuration.

6. The composition of claim 1 which includes as filler, silica, glass fiber or glass fabric, and an agent to bond the filler to the polymeric material.

7. The composition of claim 1 which includes a lubricant which is a metal derivative of a fatty acid.

8. The composition of claim 1 in which the chromium tricarbonyl complex is chemically bound to the backbone or network of the polymer.

9. The composition of claim 1 in which the chromium tricarbonyl complex is incorporated by reaction of an uncomplexed polymer with an additive containing the complex.

* * * * *